(12) United States Patent
Tanaka et al.

(10) Patent No.: US 7,123,386 B2
(45) Date of Patent: Oct. 17, 2006

(54) IMAGE READING APPARATUS

(75) Inventors: Hironori Tanaka, Yamatokoriyama (JP); Mami Aoki, Nara (JP); Hiroshi Kamijima, Okaya (JP); Masao Gomi, Shiojiri (JP)

(73) Assignee: Sharp Kabushiki Kaisha, Osaka (JP)

( * ) Notice: Subject to any disclaimer, the term of this patent is extended or adjusted under 35 U.S.C. 154(b) by 973 days.

(21) Appl. No.: 10/085,778

(22) Filed: Mar. 1, 2002

(65) Prior Publication Data
US 2002/0131092 A1 Sep. 19, 2002

(30) Foreign Application Priority Data
Mar. 2, 2001 (JP) .............................. 2001-059112

(51) Int. Cl.
*H04N 1/04* (2006.01)
(52) U.S. Cl. ...................... 358/474; 358/496; 358/497; 358/486; 358/471; 358/408
(58) Field of Classification Search ................ 358/498, 358/496, 497, 486, 471, 474, 487, 506, 505, 358/408; 399/367, 371; 318/685, 696; 382/312, 382/318, 319
See application file for complete search history.

(56) References Cited
U.S. PATENT DOCUMENTS

| | | | | |
|---|---|---|---|---|
| 4,866,531 A | * | 9/1989 | Kobori et al. ............... | 358/400 |
| 5,206,737 A | * | 4/1993 | Sugiyama ................... | 358/296 |
| 5,226,639 A | * | 7/1993 | Kida et al. .................. | 271/109 |
| 5,523,858 A | * | 6/1996 | Yamada et al. ............. | 358/412 |
| 5,548,411 A | * | 8/1996 | Sato et al. .................. | 358/400 |
| 5,862,446 A | * | 1/1999 | Hashizume et al. ........ | 399/367 |
| 6,903,848 B1 | * | 6/2005 | Kirita ......................... | 358/474 |

FOREIGN PATENT DOCUMENTS

| | | |
|---|---|---|
| JP | 1-266529 A | 10/1989 |
| JP | 6-268790 A | 9/1994 |
| JP | 10-164312 A | 6/1998 |
| JP | 11-155042 A | 6/1999 |

* cited by examiner

*Primary Examiner*—Cheukfan Lee
(74) *Attorney, Agent, or Firm*—Birch, Stewart, Kolasch & Birch, LLP

(57) ABSTRACT

An image reading apparatus of the present invention is provided with a driving unit for supplying a driving force to a scanner module and for supplying a driving force to an ADF. Changeover between the driving force for the scanner module and the driving force for the ADF is carried out by moving the scanner module, where the driving force of the scanner module and the driving force for the ADF are supplied from a single driving force source. A low cost member is used for the changeover of driving force transmission where the same driving force source (motor) supplies necessary driving force for a fed document reading mode and for a stationary document reading mode. This lowers a cost of the apparatus.

6 Claims, 7 Drawing Sheets

IMAGE READING APPARATUS

FIELD OF THE INVENTION

The present invention relates to an image reading apparatus mounted on an apparatus such as a photocopying machine and a facsimile machine, especially, to an image reading apparatus that carries out reading in one of a fed document reading mode and a stationary document reading mode, which are switched over according to a need, where reading means for reading is fixedly-positioned to read a fed-in document (a document that is being fed and is moving) (feeding-in document) in the fed document reading mode, while the reading means is moved to read a stationary document in the stationary document reading mode.

BACKGROUND OF THE INVENTION

Conventionally, facsimile machines and photocopying machines are provided with an image reading apparatus for reading a document as image information.

Examples of such image reading apparatus include an image reading apparatus that carries out reading in one of a fed document reading mode and a stationary document reading mode, which are switched over according to a need, where reading means for reading is fixedly-positioned to read a fed-in document in the fed document reading mode, while the reading means is moved to read a stationary document in the stationary document reading mode.

For example, Japanese Unexamined Patent Publication, Tokukaihei, No. 6-268790 (Publication date: Sep. 22, 1994) (Conventional Art 1) discloses a "facsimile machine" that reads a cut-sheet type of document (sheet type of document), which can be separated sheet by sheet, and a book type of document, such as a spread-book document (document of a book spread), which cannot be separated sheet by sheet.

The facsimile machine carries out reading in one of a fed document reading mode and a stationary document reading mode, which are switched over according to a need. In the fed document reading mode, the cut-sheet type of document is read by a fixedly-positioned reading unit (reading means) while the cut-sheet type of document is fed in by a document feeder. In the stationary document reading mode, the book type of document or the cut-sheet type of document is placed (is still placed (being stationary)) on a document platform, and is read by the reading unit, which is being moved to read.

However, the image reading apparatus of the facsimile apparatus that is disclosed in the Conventional Art 1 provided with separate driving force sources (motors); (a) a driving force source (motor) for supplying a driving force to the feeder, which is used in the fed document reading mode, and (b) a driving force source (motor) for supplying a driving force to the reading unit, which is being moved to read, in the stationary document reading mode. For this reason, it is necessary to provide the image reading apparatus with separate systems for supplying the driving forces from the motors to the driving force sources, respectively. This complicates a whole apparatus, thus arising problems that the apparatus has a large size and a high cost.

In view of this, Japanese Unexamined Patent Publication, Tokukaihei, No. 1-266529 (Publication Date: Oct. 24, 1989) (Conventional Art 2), discloses an art in which a driving motor is used both as a driving force source (motor) for supplying a driving force to a feeder used in the fed document reading mode, and as a driving force source (motor) for supplying a driving force to a reading unit that is moved in the stationary document reading mode.

With this arrangement, in which the same driving force source (motor) supplies the driving force required in the fed document reading mode and stationary document reading mode, it is possible to simplify a system to transmit the driving force. As a result, the whole apparatus can be miniaturized.

In the art disclosed in the Conventional Art 2, however, a solenoid or an electromagnetic clutch, which is high in cost, is used to switch over (change over) the driving force for the feeder used in the fed document reading mode and the driving force for the reading unit that is moved in the stationary document reading mode. The high cost of those members increases the cost of the whole apparatus.

SUMMARY OF THE INVENTION

The present invention has an object to provide an image reading apparatus that lowers a cost of the apparatus with an arrangement where a low-cost member is used for switching over transmission of driving forces when a driving force source (motor) is used for supplying necessary driving forces in a fed document reading mode and in a stationary document reading mode.

In order to attain the above object, an image reading apparatus of the present invention, which carries out reading in a fed document reading mode and in a stationary document reading mode, where a reading section for reading is fixedly-positioned to read a fed-in document in the fed document reading mode, while the reading section is moved to read a stationary document in the stationary document reading mode, the image reading apparatus is provided with a changeover section for switching over, by moving the reading section, between (a) a driving force for feeding in the document in the fed document reading mode, and (b) a driving force for moving the reading section in the stationary document reading mode, where the driving forces are supplied from a driving force source.

In this case, because the single driving force source supplies, in the changeover manner, (a) the driving force for feeding in a document in the fed document reading mode and (b) the driving force for moving the reading section in the stationary document reading mode, it becomes unnecessary to include separate systems for transmitting the driving force from a motor for the respective document reading modes, unlike a conventional case where each document reading mode is provided with a motor as a driving force source.

This simplifies the system for transmitting a necessary driving force from the driving force source in each document reading mode, thereby miniaturizing the apparatus.

Furthermore, with the arrangement in which the changeover section for switching over the driving forces from the driving force source carries out changeover by moving the reading section, it becomes unnecessary to use an expensive member, such as a solenoid or an electromagnetic clutch, for switching over the transmission of the driving forces from the single driving force source (motor), unlike the conventional case. This results in a low cost of the apparatus.

For a fuller understanding of the nature and advantages of the invention, reference should be made to the ensuing detailed description taken in conjunction with the accompanying drawings.

BRIEF DESCRIPTION OF THE DRAWINGS

FIG. 6(a) is an explanatory view showing a state where a scanner module has a stopping position that is regulated, while FIG. 6(b) is an explanatory view illustrating a state where the scanner module has the stopping position that is unregulated.

DESCRIPTION OF THE EMBODIMENTS

Figure 1:
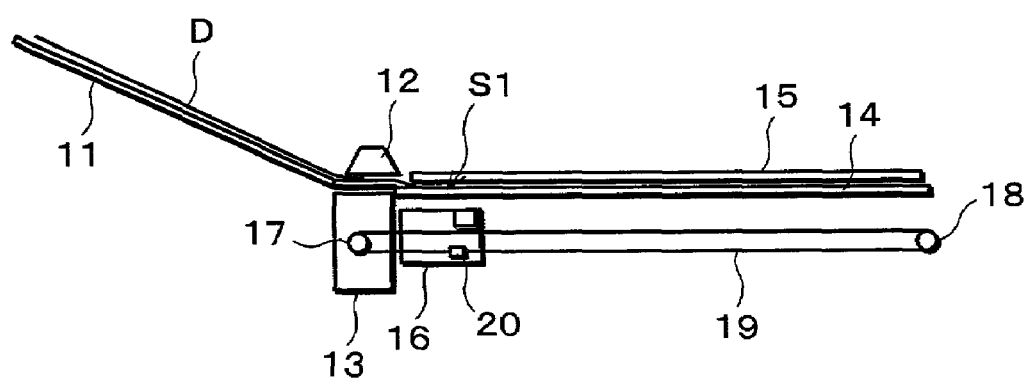
FIG. 1(a) is an explanatory view illustrating how an image reading apparatus of the present invention operates when a sheet document is read (in an ADF mode), meanwhile.
FIG. 1(b) is an explanatory view showing how the image reading apparatus shown in FIG. 1(a) operates when a book document is read (in a book mode).
Figure 1:
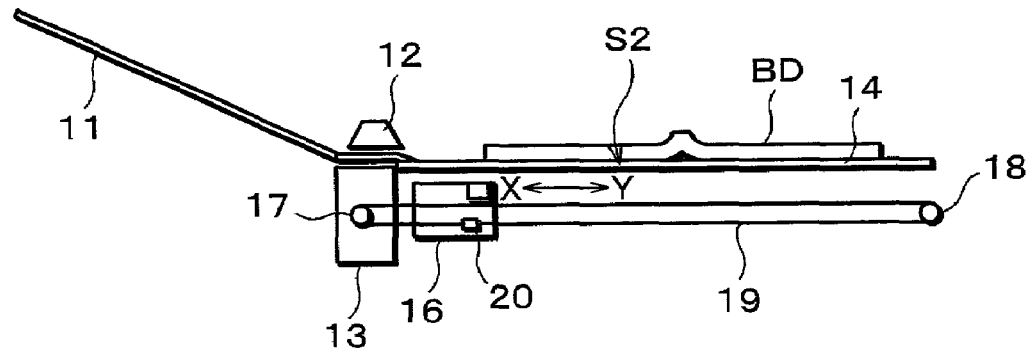

Explained below is an embodiment of the present invention.

An image reading apparatus of the present embodiment is mounted on an apparatus having a reading section for reading a document, for example, a photocopying machine and a facsimile machine. The image reading apparatus carries out reading in one of a fed document reading mode (more generally called Automatic Document Feeding mode (ADF mode)) and a stationary document reading mode (hereinafter just referred to as book mode), which are switched over according to a need, where a fed-in document (a document that is being fed and is moving) (feeding-in document) is read by a fixedly-positioned reading means in the ADF mode, while the reading means is moved to read a stationary document in the book mode. Note that the cut-sheet document, which is stationary, can be read also in the book mode, in which a stationary document is read.

The ADF mode is a mode for reading a cut-sheet document, which can be separated sheet by sheet, while the cut-sheet document is being fed in. The book mode is a mode for reading a book document (stationary document), such as a spread-book document of a book, which cannot be separated sheet by sheet. Note that, the book mode is a mode for reading a stationary document. Therefore, it is possible to read, in the book mode, even a cut-sheet document that is placed to be stationary.

The image reading apparatus, as shown in FIGS. 1(a) and 1(b), is provided with a document hopper 11, an automatic document feeding apparatus (hereinafter just referred to as ADF) 12, and a driving unit 13, which form a system to carry out reading in the ADF mode. The document hopper 11 is for placing a cut-sheet document (hereinafter, just referred to as a document D) thereon. The ADF 12 is for feeding, to a first document reading region S1 on a glass platform, a plurality of the documents D placed on the document hopper 11 in a sheet-by-sheet manner. The driving unit 13 is provided with a built-in motor as a driving force source for driving the ADF 12.

The first document reading region S1 is set in an edge portion of the glass platform 14, which is a document placing platform that is used in the book mode. Moreover, the first document reading region S1 set to have a size that makes it possible to read documents fed in by the ADF 12, while the feeding of the documents is continued. To be more precise, in the ADF mode, a scanner module 16, which is later-described reading means, is fixedly positioned right below a portion of the glass platform 14 that corresponds to the first document reading region S1, as shown in FIG. 1(a). The scanner module 16 reads the document D in this position. Therefore, the size of the first document reading region S1 is so set that the scanner module 16 can read the document D with the first document reading region S1 of that size.

Moreover, in a vicinity of the first document reading region S1 set on the glass platform 14, the document hopper 11, the ADF 12 and the driving unit 13 are mounted accordingly, so as to cooperate with each other via the first document reading region S1. The document D passes over the first document reading section S1, and is discharged to a discharging section (not shown).

Besides the first document reading region S1, set on the glass platform 14 is a second document reading region S2 for use in the book mode. The second document reading region S2, as shown in FIG. 1(b), is a region for reading a book document BD, such as a book, placed on the glass platform 14.

Moreover, as shown in FIG. 1(b), provided underneath the glass platform 14 is the scanner module 16 for reading a document image, wherein the scanner module 16 can move along directions of the X and Y arrows.

The scanner module 16 is moved along the direction of the X and Y arrows by rotation of a driving belt 19, which is entrained about a first pulley 17 and a second pulley 18, where the first pulley 17 is provided to the driving unit 13, and the second pulley 18 is provided to a box body (not shown) underneath an opposite edge portion of the glass platform 14 with respect to the driving unit 13. Moreover, the first pulley 17 is driven by the driving unit 13 (that is, the driving unit 13 supplies a driving force to the first pulley 17).

Furthermore, the scanner module 16 is provided with a driving belt holding section 20. With the driving belt holding section 20, the scanner module 16 is moved together with the driving belt 19.

The driving belt 19 and the driving belt holding section 20 of the scanner module 16 are held together in the following manner.

Figure 5:
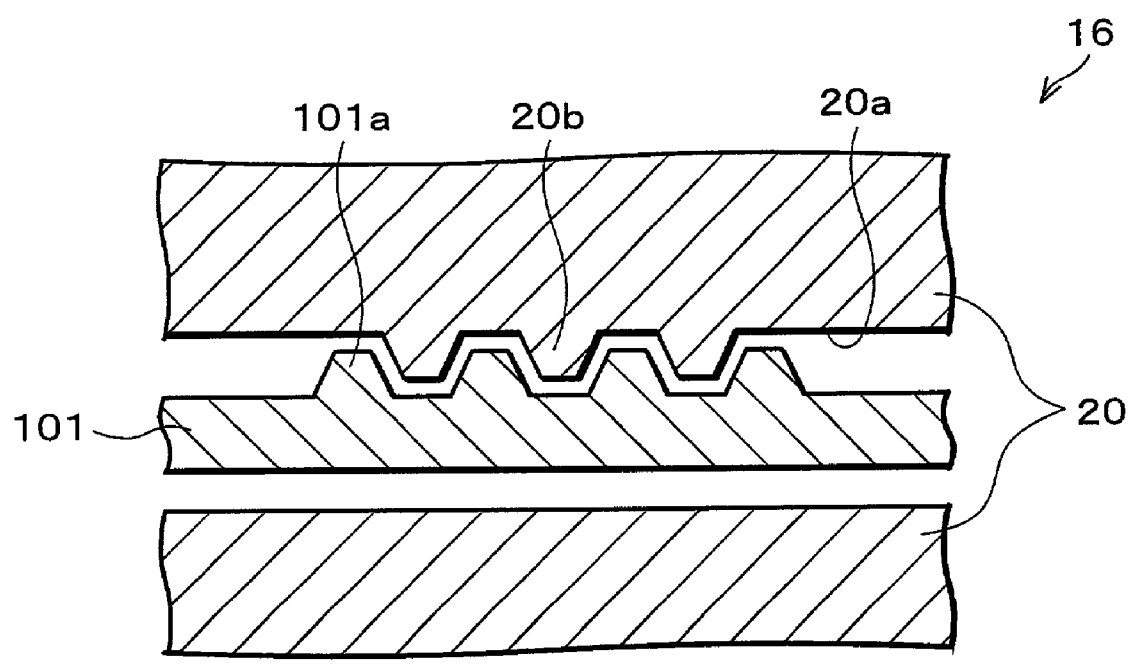
FIG. 5 is an explanatory view illustrating how a driving belt is held by a driving belt holding section of the driving unit of the image reading apparatus shown in FIG. 1.

For example, in case where the driving belt 19 is composed of a timing belt 101, the driving belt holding section 20 of the scanner module 16 may be so arranged that the timing belt 101 is held by engagement between a tooth profile 101a of the timing belt 101 and a tooth profile 20b, which is formed on a facing surface 20a. The tooth profile 20b has a shape in mesh with that of the tooth profile 101a, including a pitch of the tooth profile 101a, as shown in FIG. 5.

Moreover, in case the driving belt 19 has no means to engage with respect with a reading direction, such as a case where the driving belt 19 is a flat belt, the driving belt holding section 20 of the scanner module 16 may be so arranged as to pinch the belt to hold slippery movement of the belt.

Furthermore, in case the driving belt 19 is another type of belt apart from the timing belt and the flat belt, the driving belt holding section 20 may be so arranged that each belt has holes so that a screw or pin holds the slippery movement of the belt.

Therefore, the scanner module 16 is moved along the directions of the arrows X and Y, as shown in FIG. 1(b), in linkage with the turning of the driving belt 19, because the driving belt 19 held by the driving belt holding section 20.

Moreover, the scanner module 16 is, as shown in FIGS. 1(a) and 1(b), moved along the directions of the arrows X and Y so as to read the book document BD placed on the second document reading region S2 in the book mode, while in the ADF mode, the scanner module 16 is fixedly positioned below the first document reading region S1 so as to read the documents D, which are fed into the first document reading region S1.

In other words, when the image reading apparatus with the above arrangement is in the ADF mode, the scanner mode 16, which is stopped in a position corresponding to the first document reading region S1, reads the documents D that are being fed, as shown in FIG. 1(a).

Moreover, when the image reading apparatus with the above arrangement is in the book mode, the scanner module 16 is moved along the directions of the arrows X and Y so as to scan a region corresponding to the second document reading region S2 in order to read the book document BD, as shown in FIG. 1(b).

Here, explained below is how the image reading apparatus operates in the ADF mode, with reference to FIG. 1(a).

A plurality of documents D, which are cut-sheet documents, are placed on the document hopper 11. When an operator pushes a reading start button (not shown), the ADF 12 separates, sheet by sheet, the documents D on the document hopper 11, and feeds, sheet by sheet, the documents D to the first document reading region S1. The scanner module 16, which is fixedly positioned in the first document reading section S1, reads, sheet by sheet, the documents D that are fed into the first document reading region S1, while the documents D are being fed.

The documents D, which has been read in the first document reading region S1, is discharged to the discharging section (not shown).

Furthermore, explained below is how the image reading apparatus operates in the book mode, with reference to FIG. 1(b).

In the book mode, a document, which is a spread book, that is the book document BD, is placed on the second document reading region S2 on the glass platform 14. When an operator presses the reading start button (not shown), the scanner module 16 is moved along the directions of the arrows X and Y, under and along the glass platform 14, so as to read the book document BD.

In the image reading apparatus with the above arrangement, the driving force from the driving unit 13 is transmitted to the ADF 12 for use in the ADF mode via a transmission system (not shown), while the driving force from the driving unit 13 is transmitted, via the first pulley 17 and driving belt 19, to the scanner module 16 that is moved in the book mode. In other words, the ADF 12 and the scanner module 16 receive the driving force from the same driving unit 13.

Here, the driving force from the driving unit 13 is, strictly speaking, a driving force from the motor that is the driving force source built in the driving unit 13. For convenience, it is defined in the following explanation that the wording "the driving force from the driving unit 13" has an identical meaning to that of the wording "the driving force from the motor built in the driving unit 13.

The reading is not carried out, at the same time, both in the ADF mode using the ADF 12 and in the book mode in which the scanner module 16 is moved. Therefore, the driving unit 13 can be compact when the driving unit 13 is provided only one driving force source, for example, the motor built in the driving unit 13, and the driving force is supplied in a switching-over manner in accordance with the switch-over of the modes.

Where the same driving force source (motor) is used for driving both in the ADF mode and in the book mode in the image reading apparatus that carries out reading in the ADF mode and the book mode, it is possible to give the image reading apparatus a simplified arrangement. As a result, it is possible to reduce a weight and a cost of the image reading apparatus.

The motor is directly connected to a motor gear 24. A motor that moves forwardly and backwardly, for example, a pulse motor, is suitable for this motor.

Here, provided below is a detailed explanation on the arrangement of the driving unit 13, with reference to FIGS. 2 to 4.

Figure 2:
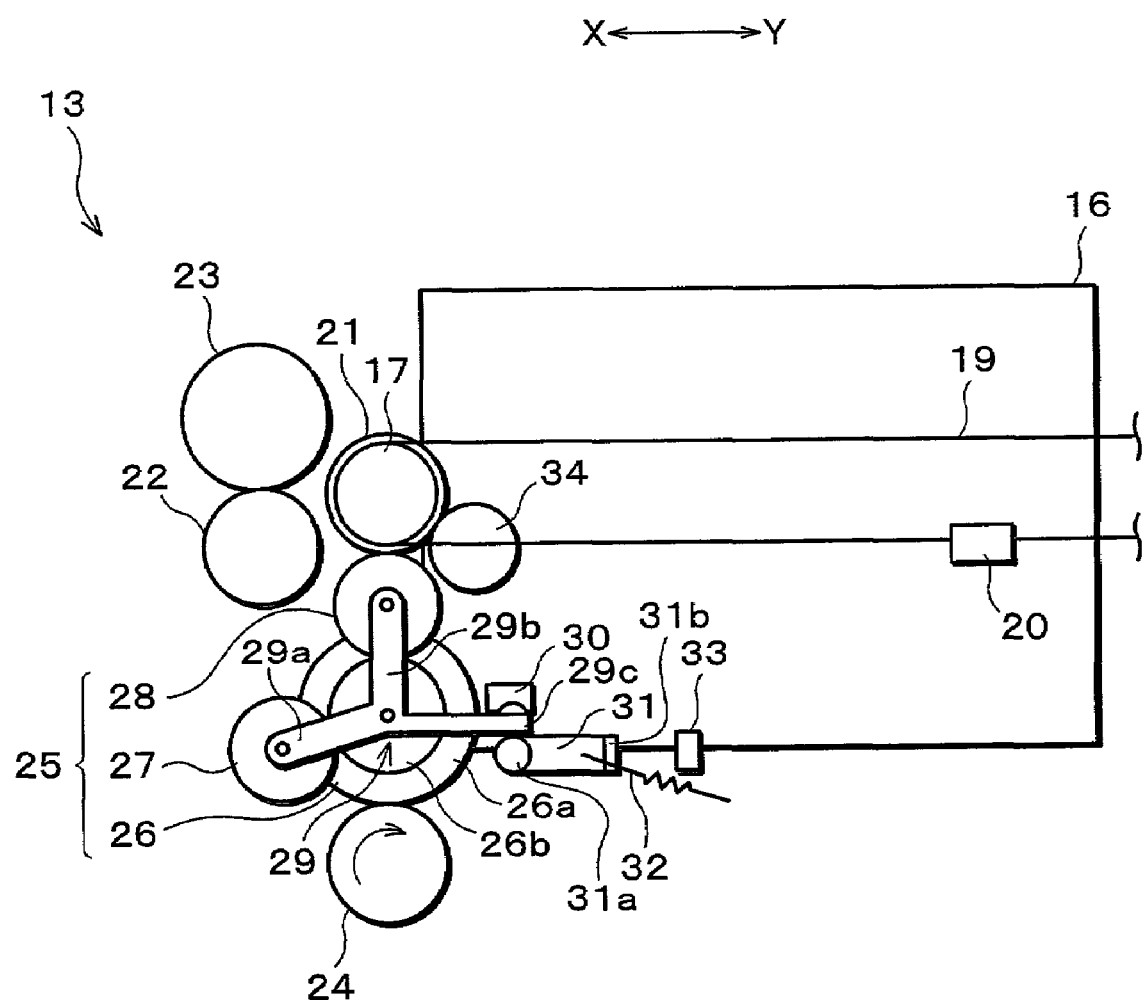
FIG. 2 is an explanatory view showing how a driving unit of the image reading apparatus shown in FIG. 1 operates in the book mode.

As shown in FIG. 2, the driving unit 13 is provided with (a) a scanner gear (driving gear) 21, (b) a first ADF gear 22, (c) a second ADF gear 23, (d) a motor gear 24, and (e) a planetary gear apparatus 25. The scanner gear 21, which is integrated with the first pulley 17, transmits the driving force to the scanner module 16. The first ADF gear 22 and the second ADF gear 23 transmit the driving force to the ADF 12 (FIG. 1). The motor gear 24 is directly connected to the motor (not shown) as the driving force source. The planetary gear apparatus 25 transmits the driving force of the motor gear 24 to one of the scanner gear 21 and the first ADF gear 22, in a switching-over manner.

It is assumed here that the scanner gear 21, the first ADF gear 22, the second ADF gear 23, and the motor gear 24 are supported by supporting shafts so that those gears can rotate freely, where the supporting shafts are fixed to a box body that composes the driving unit 13, or a box body of the image reading apparatus.

The planetary gear apparatus 25 is composed of a sun gear unit 26 and two planetary gears (a first planetary gear 27 and a second planetary gear 28). The sun gear unit 26 has two types of gears having different diameters, which rotate integrally about a same shaft.

The sun gear unit 26 is composed of a first gear 26a and a second gear 26b, which rotate integrally about the same shaft fixed to a box body that composes the driving unit 13, or a box body of the image reading apparatus, where the first gear 26a has a larger diameter and the second gear 26b has a smaller diameter.

The first gear 26a is positioned so as to be engaged with the motor gear 24, while the second gear 26b is positioned so as to be engaged with each of the first planetary gear 27 and the second planetary gear 28. With this, the driving force from the motor gear 24 is transmitted to the first planetary gear 27 and the second planetary gear 28 via the first gear 26a and the second gear 26b.

The first gear 26a and the second gear 26b are supported, by using shafts, by a planetary lever, which is supported by the supporting shaft of the sun gear unit 26 so that the planetary lever 29 can rotate freely about the supporting shaft of the sun gear unit 26.

The planetary lever 29 has supporting levers (a first lever 29a, a second lever 29b, and a third lever 29c), which are extended respectively to three directions. The planetary lever 29 is supported, in its center, by the supporting shaft of the sun gear unit 26 so that the planetary lever 29 can rotate freely about the same shaft.

An interior angle between the first lever 29a and the second lever 29b is set to 120°, approximately. An interior angle between the second lever 29b and the third lever 29c is set to 90°, approximately. Those angles are appropriately set according to conditions such as a positional arrangement between (a) the gear (namely, the first ADF gear 22 or the scanner gear 21) to engage with the first planetary gear 27 and the second planetary gear 28, and (b) a later-described stopper pin 30 for regulating the rotation of the planetary lever 29, and the like.

Figure 3:
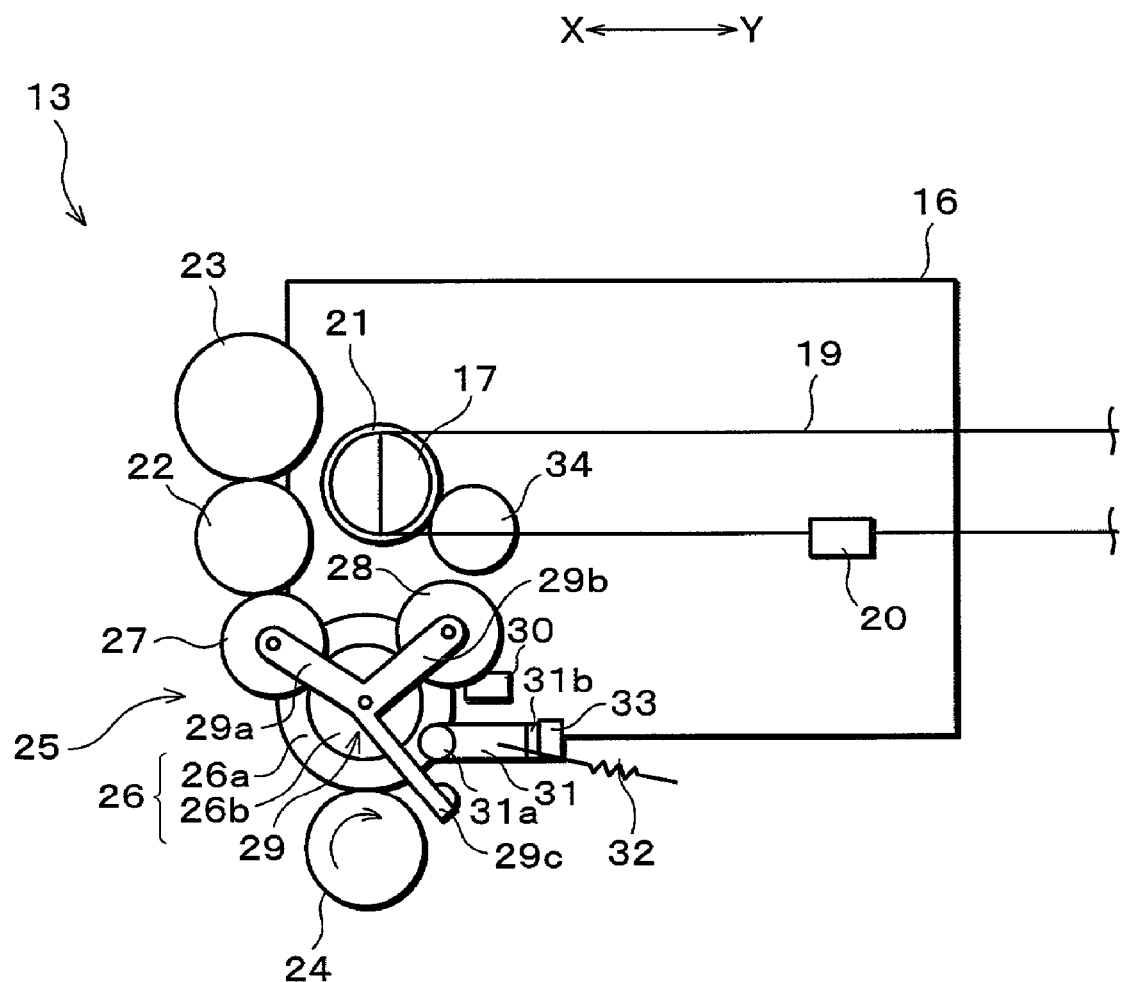
FIG. 3 is an explanatory view illustrating how the driving unit of the image reading apparatus shown in FIG. 1 operates in the ADF mode.

In the planetary gear apparatus 25, the rotation of the sun gear unit 26 causes the second planetary gear 28 to engage with the scanner gear 21, as shown in FIG. 2, and causes the first planetary gear 27 to engage with the first ADF gear 22, as shown in FIG. 3.

Here, when the motor gear 24 is rotated forwardly, that is, in the arrow direction indicated in FIG. 2 (hereinafter, this direction is described as "clockwise"), the first gear 26a of the sun gear unit 26, which is engaged with the motor gear 24, is rotated anticlockwise. Then, the first planetary gear 27 and the second planetary gear 28, which are engaged with the second gear 26b that rotates integrally with the first gear 26a, rotates clockwise, while intending to move around the sun gear unit 26 anticlockwise.

Where the second planetary gear 28 is, as shown in FIG. 2, engaged with the scanner gear 21 in this state, when the scanner gear 21 rotates anticlockwise, the first pulley 17, which is integrated with the scanner gear 21, rotates anitclockwise as well. The driving belt 19 also turns anticlockwise. The driving belt 19 moves the scanner module 16 in the direction of the arrow Y.

On the contrary, when the motor gear 24 rotates backwardly, that is, rotates anticlockwise, where the second planetary gear 28 is engaged with the scanner gear 21 as shown in FIG. 2, the scanner gear 21 rotates clockwise so that the scanner module 16 is moved in the direction of the arrow X by the turning of the driving belt 19, which is due to clockwise rotation of the first pulley 17.

On the other hand, in the planetary gear apparatus 25, when where the first planetary gear 27 is engaged with the first ADF gear 22 as shown in FIG. 3, the clockwise rotation of the motor gear 24 causes the first ADF gear 22 to rotate anticlockwise, so that the second ADF gear 23, which is engaged with the first ADF gear 22, rotates clockwise. The rotation of the second ADF gear 23 is supplied, via a driving force transmission system (not shown), to the ADF 12 shown in FIGS. 1(a) and 1(b).

The third lever 29c of the planetary lever 29 is used for maintaining (a) the engagement between the first planetary gear 27 and the first ADF gear 22, and (b) the engagement between the second planetary gear 28 and the scanner gear 21.

Moreover, the scanner module 16 is, as shown in FIG. 2, provided with the stopper pin 30 for regulating the rotation of the planetary lever 29, and a stopper driving pin 33 for controlling movement of a stopper 31, which is provided to the box body of the image reading apparatus.

The stopper 31 is provided in such a manner that the stopper 31 can move along the directions of the arrows X and Y. The stopper 31 is provided with a stopper spring 32 at its end portion with respect to the direction of the arrow Y, that is, its rear end section 31b. The stopper spring 32 is fixed to the box body of the image reading apparatus. The stopper spring 32 applies a force onto the stopper 31 in the direction of the arrow Y.

The stopper 31 has a home position in a location where an fore end section 31a faces the stopper pin 30 as shown in FIG. 2. In short, in the home position, no force of the stopper spring 32 is applied onto the stopper 31.

In the home position, the third lever 29c is pinched between the stopper pin 30 and the stopper 31 so that the third lever 29c is prevented by the stopper pin 30 from rotating anticlockwise and prevented by the stopper 31 from rotating clockwise.

This keeps the second planetary gear 28 to be engaged with the scanner gear 21 as shown in FIG. 2, in the book mode.

In short, when the motor gear 24 rotates clockwise, the sun gear unit 26 rotates anticlockwise, so that the first planetary gear 27 and the second planetary gear 28 intend to rotate anticlockwise. However, the anticlockwise rotation of the planetary lever 29 is prevented because the third lever 29c of the planetary lever 29 abuts against the stopper pin 30, thereby keeping the second planetary gear 28 and the scanner gear 21 in engagement.

On the other hand, when the motor gear 24 rotates anticlockwise, the sun gear unit 26 rotates clockwise, so that the first planetary gear 27 and the second planetary gear 28 intend to rotate clockwise. However, the clockwise rotation of the planetary lever 29 is prevented because the third lever 29c of the planetary lever 29 abuts against the fore end section 31a of the stopper 31, thereby keeping the second planetary gear 28 and the scanner gear 21 in engagement.

The stopper driving pin 33 abuts against the rear end section 31b of the stopper 31, when the scanner module 16 is moved in the direction of the arrow X. In this way, the stopper driving pin 33 moves the stopper 31 in the direction of the arrow X, against the force applied by the stopper spring 32.

In short, the motor gear 24 rotates clockwise when the scanner module 16 moves in the direction of the arrow X. In this case, the clockwise rotation of the motor gear 24 causes the sun gear unit 26 to rotate anticlockwise, whereby the first planetary gear 27 and the second planetary gear 28 rotates clockwise. In other words, the planetary lever 29 rotates clockwise. Therefore, the third lever 29c intends to rotate in such a direction that the third lever 29c abuts against the fore end section 31a of the stopper 31.

However, the stopper 31 is so arranged as to move in the direction of the arrow X in linkage of the movement of the scanner module 16 in the direction of the arrow X, as shown in FIG. 3, so that the third lever 29c is separated from the fore end section 31a (that is, the abutment of the third lever 29c against the fore end section 31a is ended). This allows the third lever 29c, in other words, the planetary lever 29 to rotate clockwise.

As described above, the clockwise rotation of the planetary lever 29 moves the first planetary gear 27 to a position where the first planetary gear 27 engages with the first ADF gear 22. Here, the second planetary gear 28 abuts against the stopper pin 30 as shown in FIG. 3, so that the planetary lever 29 cannot rotate further than that.

Therefore, the rotation force from the motor gear 24 is transmitted to the ADF 12 (see FIGS. 1(a) and 1(b)) through the first gear 26a, the second gear 26b, the first planetary gear 27, the first ADF gear 22, the second ADF gear 23, and the driving force transmission system.

As described above, simply by changing the rotation direction of the motor gear 24, that is, the rotation direction of one motor (driving force source), it is possible to switch over the engagement of the first planetary gear 27 and the second planetary gear 28 of the planetary gear apparatus 25. This realizes a simple changeover (switching over) between the driving force for the scanner module 16 and the driving force for the ADF 12.

Here, provided below is an explanation how the image reading apparatus switches over the modes, with reference to the FIGS. 2 and 3.

To begin with, the changeover from the book mode to the ADF mode is explained. The changeover is performed by operating an operation panel of a photocopying machine (not shown).

In the book mode shown in FIG. 2, the motor gear 24 is rotated anticlockwise to move the scanner mode 16 in the direction of the arrow X, out of the home position of the book mode. Here, the stopper driving pin 33, which is fixed to the scanner module 16, abuts against the rear end section 31b of the stopper 31, so as to push and move the stopper 31 in the direction of the arrow X, opposing to the force applied by the stopper spring 32.

The movement of the stopper 31 in the direction of the arrow X separates the fore end section 31a of the stopper 31 and the third lever 29c of the planetary lever 29. This allows the second planetary gear 28 to rotate clockwise about the sun gear unit 26, so that the second planetary gear 28 rotates until the second planetary gear 28 abuts against the stopper pin 30, as shown in FIG. 3.

At the same time, the first planetary gear 27 rotates about the sun gear unit 26, similarly to the second planetary gear 28, until the first planetary gear 27 is engaged with the first ADF gear 22 as shown in FIG. 3.

Here, the driving of the ADF 12 is limited to the direction of the backward rotation of the motor gear 24, so that the ADF 12 will be stopped or backwardly rotated. This maintains, until the ADF mode is changed over, (a) the engagement of the first planetary gear 27 and the first ADF gear 22 and (b) the abutment of the second planetary gear 28 against the stopper pin 30.

Next, the changeover from the ADF mode to the book mode is explained. The changeover is performed by operating the operation panel of the photocopying machine (not shown), similarly to the above-described changeover from the book mode to the ADF mode.

In the ADF mode shown in FIG. 3, the ADF 12 is driven when the motor gear 24 rotates anticlockwise. The clockwise rotation of the motor gear 24 causes the first planetary gear 27 and the second planetary gear 28 to rotate anticlockwise about the sun gear unit 26, so as to separate the first planetary gear 27 from the first ADF gear 22.

Then, the clockwise rotation of the motor gear 24 causes the planetary gear 28 to rotate anticlockwise about the sun gear unit 26, so that the planetary gear 28 is engaged with the scanner gear 21. Here, the third lever 29c of the planetary lever 29 rotates anticlockwise until the third lever 29c abuts against the stopper pin 30, without abutting against the fore end section 32a of the stopper 31. This maintains the planetary gear 28 and the scanner gear 21 to be engaged with each other.

Moreover, when the second planetary gear 28 and the scanner gear 21 are engaged with each other, further clockwise rotation of the motor gear 24 causes the scanner gear 21 to rotate anticlockwise, so that the scanner module 16 is moved in the direction of the arrow Y. Here, the stopper driving pin 33 of the scanner module 16 stops regulating the stopper 31, so that the third lever 29c of the planetary lever 29 is pinched between the fore end section 31a and the stopper pin 30, as shown in FIG. 2. This switches over from the ADF mode to the book mode, and maintains a state of the planetary gear apparatus 25, that is, the engagement of the second planetary gear 28 and scanner gear 21.

A In addition, a driving system of the driving unit 13 with the above arrangement is controlled usually by software. In other words, a control apparatus of the photocopying machine, on which the image reading apparatus is mounted, controls the driving system of the driving unit 13.

However, there are cases where the image reading apparatus is stopped in a location not for the ADF mode nor for the book mode, that is, in an abnormal location, such as a case of power stoppage, or a case where the software has a bug. In those cases, it is necessary to bring back the image reading apparatus to a normal location, that is, to one of the location for the book mode shown in FIG. 2 and that for the ADF mode shown in FIG. 3.

In view of this, explained below is a system (back-up mode) for bringing back the image reading apparatus from the abnormal location to a normal stopping location.

Usually, for example, in case where the image reading apparatus is abnormally stopped in the book mode, it is possible to restore a normal condition by using a simple procedure, such as checking an actual location of the image reading apparatus through moving the scanner module 16 right and left (in the directions of the arrows X and Y (see FIG. 2)).

Figure 4:
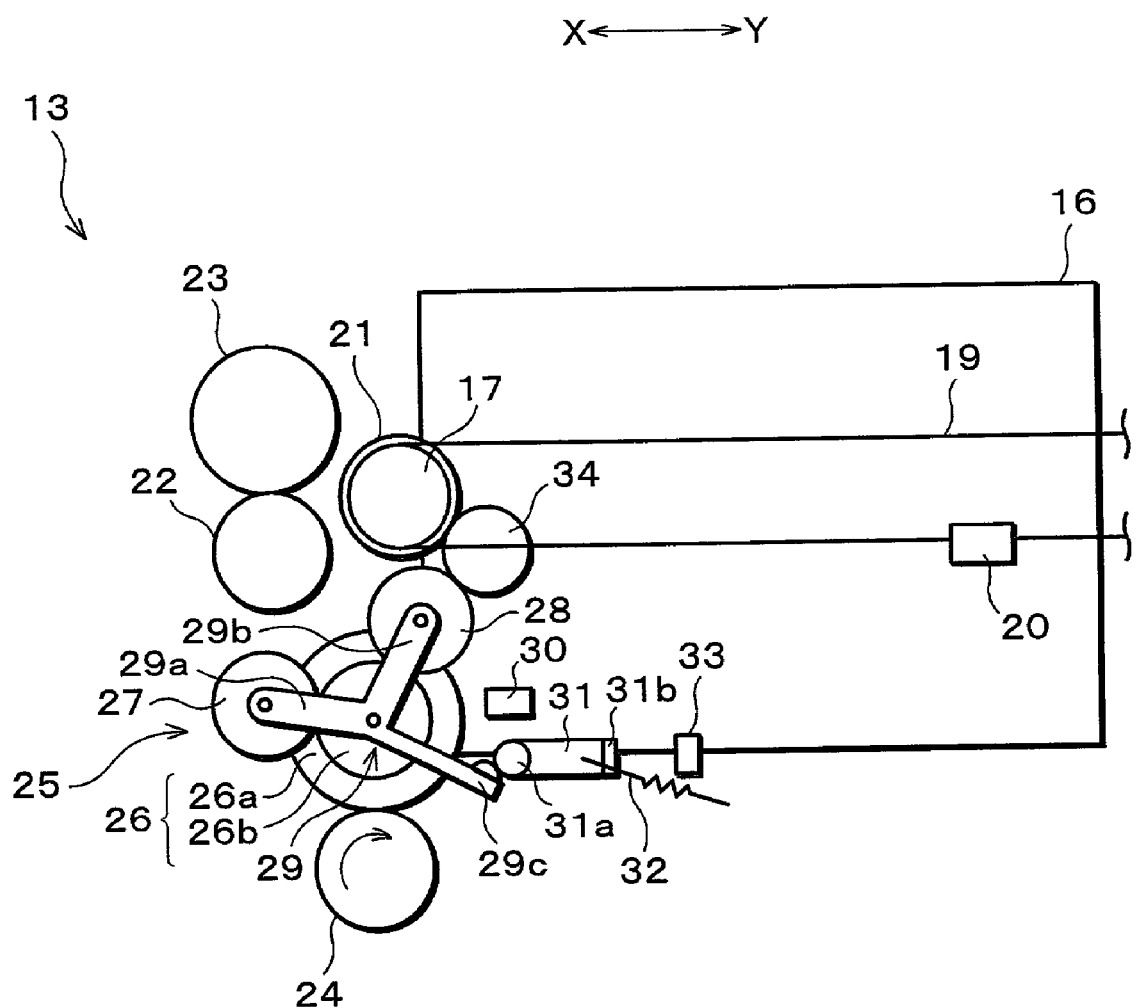
FIG. 4 is an explanatory view showing how the driving unit of the image reading apparatus shown in FIG. 1 operates in a back-up mode.

Moreover, in case where the image reading apparatus is abnormally stopped in the ADF mode, for example in case where the scanner module 16 is moved in the direction of the arrow Y while the stopper 31 is moved to its home position during the book mode as shown in FIG. 4, it is very difficult to restore the normal condition if no special system is provided.

However, the present image reading apparatus is, as shown in FIG. 4, provided with an auxiliary gear 34, which is restoring means for moving the scanner module 16 to the normal position when the scanner module 16 is moved in the direction of the arrow Y in the ADF mode while the stopper 31 is moved to its home position of the book mode.

The auxiliary gear 34 is so arranged that the auxiliary gear 34 engages with the second planetary gear 28 when the third lever 29c of the planetary lever 29 abuts the fore end section 31a of the stopper 31. In this state, the clockwise rotation of the motor gear 24 transmits the driving force thereof to the scanner gear 21, via the sun gear unit 26, the second planetary gear 28, and the auxiliary gear 34. The scanner gear 21 rotates clockwise so that the scanner module 16 is moved in the direction of the arrow X.

This causes the stopper driving pin 33 to abut the rear end section 31b of the stopper 31 again, so that the stopper driving pin 33 pushes the rear end section 31b in the direction of the arrow X, thereby separating the third lever 29c of the planetary lever 29 from the fore end section 31a of the stopper 31. As a result, the planetary lever 29 is rotated until the third lever 29c abuts against the stopper pin 30 so that the first gear 27 engages with the first ADF gear 22. In this way, the ADF mode shown in FIG. 3 is restored.

The image reading apparatus with the above arrangement carries out the changeover of the driving force from the single motor, which is the driving force source for the scanner module 16 and the ADF 12, by moving the planetary gear apparatus 25 and by moving, in the directions of the arrows X and Y, the scanner module 16, which is the reading means that is in linkage with the planetary gear apparatus 25. Therefore, with the image reading apparatus having the above arrangement, it is possible to manufacture the apparatus at a lower cost, compared with a conventional case where a solenoid or an electromagnetic clutch is used as changeover means for supplying the driving forces from a single motor in the changeover manner. As a result, it is possible to realize a low-cost image reading apparatus.

The above scanner module 16 is so arranged that a rotation section including the sun gear unit 26, the first planetary gear 27, and the second planetary gear 28 has a spring inside thereof, which gives a pressure to the rotation section, so that a rotation force of the sun gear unit 26 causes the first planetary gear 27 and the second planetary gear 28 to rotate about the sun gear unit 26, whereby the driving forces from the motor gear 24 is switched over between the ADF mode and the book mode.

However, there is a case where an external factor, such as vibration, causes a slight positional shift of the scanner module 16. For this reason, especially in the ADF mode where the document D is read by the fixedly positioned scanner module 16, it is necessary to accurately stop the scanner module 16 in a stopping position.

Figure 6:
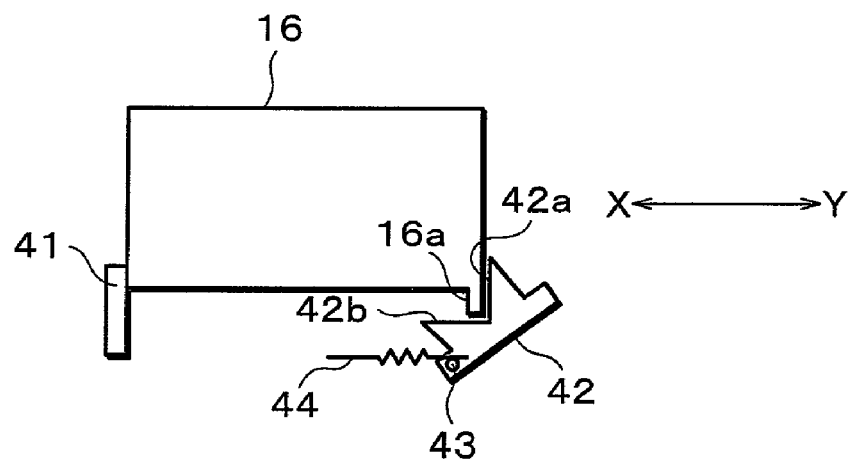
Figure 6:
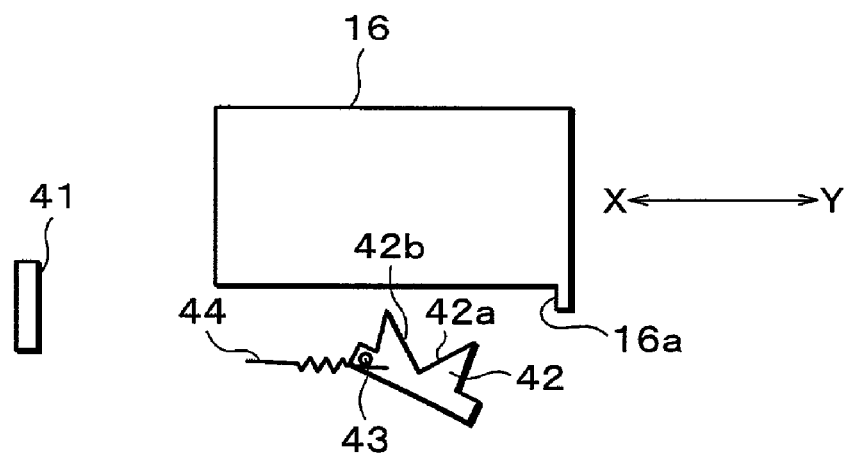

Here, explained is a system for improving accuracy of stopping the scanner module 16 in the stopping position in the ADF mode, with reference to FIGS. 6(*a*) and 6(*b*).

In the ADF mode, the scanner module 16 is so arranged that the movement of the scanner module 16 in the directions of the arrows X and Y is regulated by two stoppers (a first stopper 41 and a second stopper 42), as shown in FIG. 6(*a*).

The first stopper 41 regulates the movement of the scanner module 16 in the direction of the arrow X, while the second stopper 42 regulates the movement of the scanner module 16 in the direction of the arrow Y.

The first stopper 41 is fixed to the box body of the image reading apparatus, or that of the driving unit 13. The second stopper 42 is supported by a supporting shaft 43, so that the second stopper 42 can rotate freely about the supporting shaft 43, where the supporting shaft 43 is fixed to the box body of the image reading apparatus, or that of the driving unit 13.

The second stopper 42 is connected with a seesaw spring 44 in a vicinity of its center of rotation. The seesaw spring 44 is provided so as to stably hold the second stopper 42 in a state shown in FIG. 6(*a*), and in a state shown in FIG. 6(*b*).

Moreover, the second stopper 42 has a valley-like shaped regulating surface (surface to carry out the regulation) with respect to the scanner module 16, as shown in FIGS. 6(*a*) and 6(*b*). In the state shown in FIG. 6(*a*) where the position is regulated (hereinafter, the state is referred to as a regulated position state), a first regulating surface 42*a* in the regulating surface abuts against the scanner module 16. Meanwhile, the first regulating surface 42*a* does not abut against the scanner module 16 in the state shown in FIG. 6(*b*) where the position is not regulated (hereinafter, the state is referred to as a released position state).

Moreover, in case it is switched over from the released position state shown in FIG. 6(*b*) to the regulated position state shown in FIG. 6(*a*), the movement of the scanner module 16 in the direction of the arrow X causes a projection section 16*a*, which is formed on a bottom edge section of the scanner module 16, to abut against a second regulating surface 42*b* of the regulating surface of the second stopper 42, where the second regulating surface 42*b* is in opposition to the first regulating surface 42*a*. This causes the second stopper 42 to rotate anticlockwise so that the second stopper 42 performs positional regulation of the scanner module 16 by the seesaw spring 44, as shown in FIG. 6(*a*).

In addition, it is needless to say that all positional regulation methods, such as a method of inserting a detent in, are effective for the positional regulation method, besides the one described above.

Figure 7:
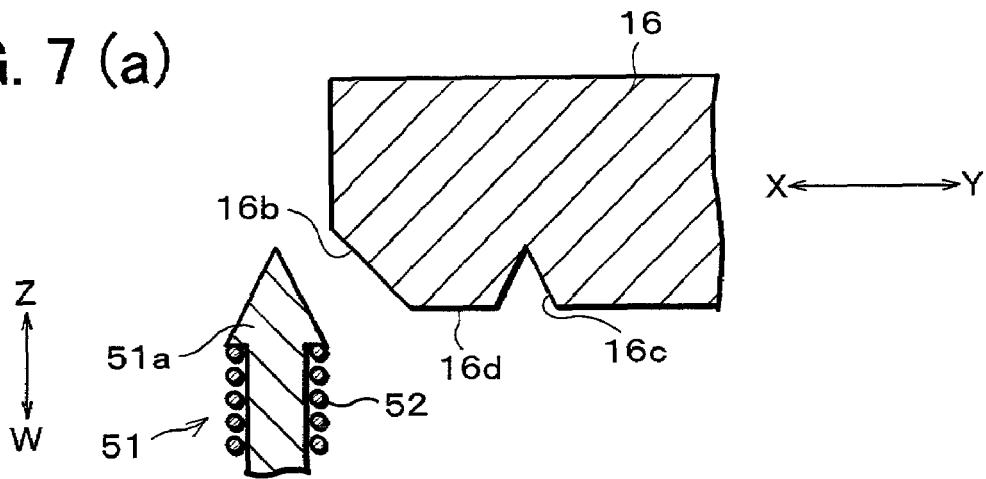
FIGS. 7(a) to 7(c) are explanatory views illustrating how the stopping position of the scanner module is regulated.
Figure 7:
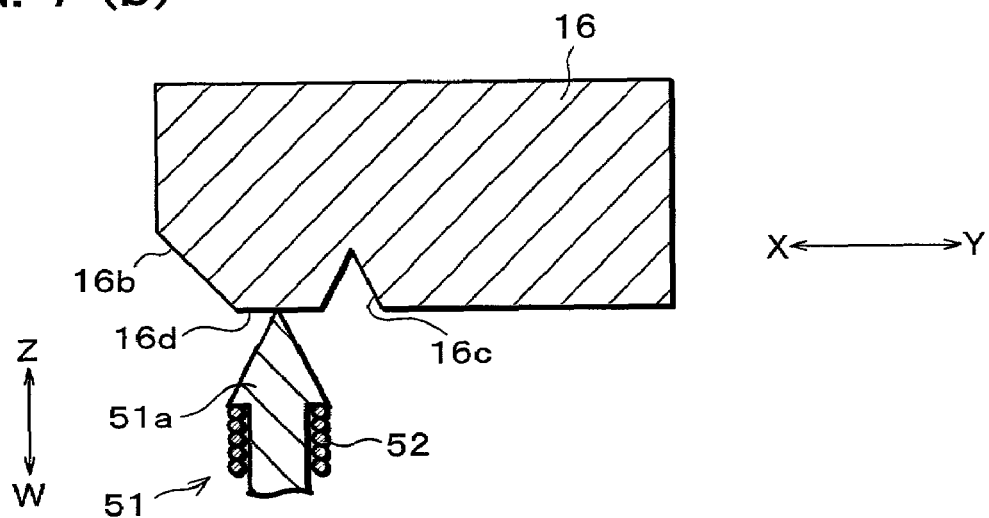
Figure 7:
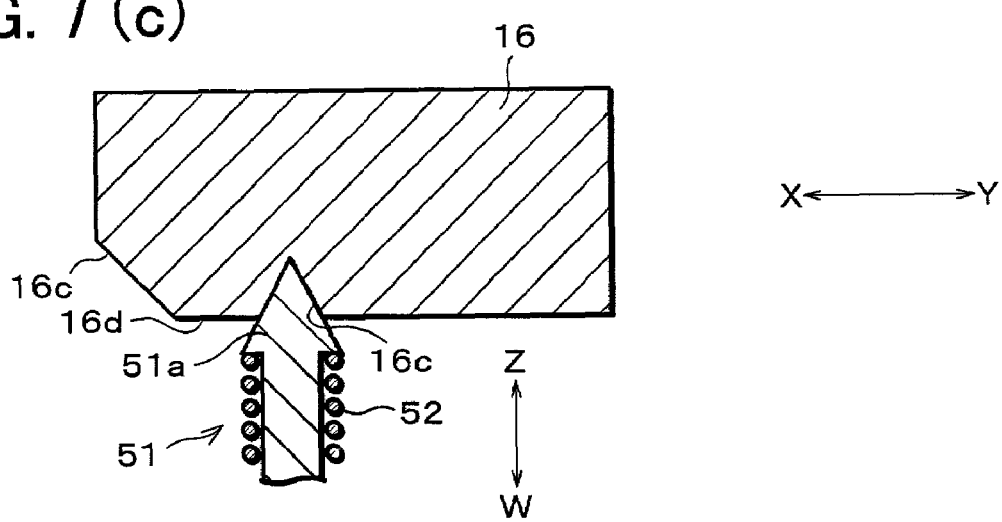

Explained here is the positional regulation method in which the positional regulation of the scanner module 16 is carried out by inserting the detent in, with reference to the FIGS. 7(*a*) to 7(*c*).

In this case, as shown in FIGS. 7(*a*) to 7(*c*), the image reading apparatus or a predetermined portion of the image reading apparatus is provided with a detent 51 and a spring 52. The detent 51 can moved in directions of the arrows W and Z (vertical directions) that cross at the right angle the directions of the arrows X and Y (horizontal directions).

Moreover, the scanner module 16 has a slope 16*b* and a recess 16*c*. The slope 16*b* abuts against a head section 51*a* of the detent 51 when the scanner module 16 moves in the direction of the arrow X. The recess 16*c*, which is formed on a bottom surface 16*d* of the scanner module 16, engages with a part of the head section 51*a* of the detent 51.

The detent 51 is in waiting state in which the head section 51*a* is projected out with respect to the bottom surface 16*d* of the scanner module 16, as shown in FIG. 7(*a*) when the scanner module 16 is in the position for reading the document in the book mode.

When the ADF mode is selected in the book mode, the scanner module 16 moves in the direction of the arrow X. Here, firstly the head section 51*a* of the detent 51 abuts against the slope 16*b* of the scanner module 16, then the detent 51 is moved in the direction of the arrow W, as the scanner module 16 moves in the direction of the arrow X, while the detent 51 opposes to a force applied in the direction of the arrow Z by the spring 52. Thereafter, the detent 51 abuts against the bottom surface 16*d* of the scanner module 16 as shown in FIG. 7(*b*).

Further movement of the scanner module 16 in the direction of the arrow X, further from the state shown in FIG. 7(*b*), causes the head section 51*a* of the detent 51 to engage with the recess 16*c* of the scanner module 16, as shown in FIG. 7(*c*). If the position of the scanner module 16 in this state is set to be a document reading position (reading position) of the scanner module 16 for reading a document in the ADF mode (document reading position of the ADF mode), no driving force is transmitted to the scanner module 16, and the head section 51*a* of the detent 51 engages with the recess 16*c* of the scanner module 16, when the scanner module 16 is in this position. This makes it possible to prevent subtle movement, that is, subtle deflection of the scanner module 16.

As described above, in case the detent 51 is used, a friction force is only restriction force that prevents the scanner module 16 from moving in the directions of the arrows X and Y (horizontal directions). Therefore, the scanner module 16 can be moved subtly by arranging the head section 51*a* of the detent 51 so that a component of force, which is appropriately larger than the friction force to move the scanner module. This makes it possible to regulate the scanner module 16 in a predetermined position by using the detent 51.

As described above, an image reading apparatus of the present invention, which carries out reading in a fed document reading mode and in a stationary document reading mode, where reading means for reading is fixedly-positioned to read a fed-in document in the fed document reading mode, while the reading means is moved to read a stationary document in the stationary document reading mode, the image reading apparatus is provided with changeover means for switching over, by moving the reading means, between (a) a driving force for feeding in the document in the fed document reading mode, and (b) a driving force for moving the reading means in the stationary document reading mode, where the driving forces are supplied from a driving force source.

Therefore, because the single driving force source supplies, in the changeover manner, (a) the driving force for feeding in a document in the fed document reading mode and (b) the driving force for moving the reading means in the stationary document reading mode, it becomes unnecessary to include separate systems for transmitting the driving force from a motor for the respective document reading modes, unlike a conventional case where each document reading mode is provided with a motor as a driving force source.

This simplifies the system for transmitting a necessary driving force from the driving force source in each document reading mode, thereby miniaturizing the apparatus.

Furthermore, with the arrangement in which the changeover means for switching over the driving forces from the driving force source carries out changeover by moving the reading means, it becomes unnecessary to use an expensive member, such as the solenoid or the electromagnetic clutch, for switching over the transmission of the driving forces from the single driving force source (motor), unlike the conventional case. This results in a low cost of the apparatus.

The changeover means may be so adopted to include at least two planetary gears, wherein the changeover means switches over the planetary gears to switch over the driving forces that are from the driving force source.

In this case, as few as two planetary gears that compose the changeover means are needed to be used in order to realize that the driving forces are switched over at the time the two modes are switched over, namely the fed document reading mode and the stationary document reading mode. This further simplifies the arrangement of the changeover means.

The image reading apparatus may be so arranged that the planetary gears are switched over in such a manner that, where the driving force source is a motor, rotation of the motor and the movement of the reading means are linked with each other.

In this case, there is no need to include a separate means for switching over the planetary gears. thus, this simplifies the arrangement of the changeover means.

The image reading apparatus may include an auxiliary gear being engaged with a driving gear of the reading means, wherein the auxiliary gear is engaged with the planetary gears when the reading means is shifted from a document reading position in the fed document reading mode, where the driving gear receives the driving force from the planetary gears.

In this arrangement, the auxiliary gear, which engages with the driving gear of the reading means, is engaged with the planetary gears when the reading means is shifted from the predetermined document reading position. In this way, the rotation of the planetary gear transmits the driving force to the driving gear via the auxiliary gear. This corrects the shift in the document reading position of the reading means, and brings the reading means to the document reading position of the fed document reading mode.

Therefore, this gives such an effect that the positional shift of the reading means in the fed document reading mode can be corrected with the simple arrangement.

In the fed document reading mode in which the fed in document is read, the accuracy of reading the document may be lowered due to the shift in the document reading position, which may be caused by deflection for example, while the document is read.

Therefore, it may be thought of providing the image reading apparatus with regulating means for regulating a document reading position in the fed document reading mode.

In this way, in the fed document reading mode, the regulation means regulates a position to which the document reading position of the reading means is regulated by the regulation means. This prevents the deterioration in the accuracy of the reading, for example, due to the deflection of the reading means.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. An image reading apparatus, which carries out reading in a fed document reading mode and in a stationary document reading mode, where reading means for reading is fixedly-positioned to read a fed-in document in the fed document reading mode, while the reading means is moved to read a stationary document in the stationary document reading mode, the image reading apparatus comprising:

changeover means for switching over, by moving the reading means, between (a) a driving force for feeding in the document in the fed document reading mode, and (b) a driving force for moving the reading means in the stationary document reading mode, where the driving forces are supplied from a driving force source, wherein the changeover means includes a plurality of planetary gears.

2. The image reading apparatus as set forth in claim 1, wherein:

the changeover means switches over the planetary gears to switch over the driving forces that are from the driving force source.

3. The image reading apparatus as set forth in claim 2, comprising:

an auxiliary gear being engaged with a driving gear of the reading means, wherein the auxiliary gear is engaged with the plurality of planetary gears when the reading means is shifted from a document reading position in which the document is read in the fed document reading mode, where the driving gear receives the driving force from the plurality of planetary gears.

4. The image reading apparatus as set forth in claim 2, wherein, the plurality of planetary gears are switched over in such a manner that, where the driving force source is a motor, rotation of the motor and the movement of the reading means are linked with each other.

5. The image reading apparatus as set forth in claim 4, comprising:

an auxiliary gear, being engaged with a driving gear of the reading means, wherein the auxiliary gear is engaged with the plurality of planetary gears when the reading means is shifted from a document reading position in which the document is read in the fed document reading mode, where the driving gear receives the driving force from the plurality of planetary gears.

6. The image reading apparatus as set forth in claim 1, comprising:

regulating means for regulating a document reading position in which the document is read in the fed document reading mode.

* * * * *